United States Patent
Grabska-Barwinska et al.

(10) Patent No.: US 11,842,264 B2
(45) Date of Patent: Dec. 12, 2023

(54) GATED LINEAR NETWORKS

(71) Applicant: DeepMind Technologies Limited, London (GB)

(72) Inventors: Agnieszka Grabska-Barwinska, London (GB); Peter Toth, London (GB); Christopher Mattern, London (GB); Avishkar Bhoopchand, London (GB); Tor Lattimore, London (GB); Joel William Veness, London (GB)

(73) Assignee: DeepMind Technologies Limited, London (GB)

( * ) Notice: Subject to any disclaimer, the term of this patent is extended or adjusted under 35 U.S.C. 154(b) by 667 days.

(21) Appl. No.: 16/759,993

(22) PCT Filed: Nov. 30, 2018

(86) PCT No.: PCT/EP2018/083094
§ 371 (c)(1),
(2) Date: Apr. 28, 2020

(87) PCT Pub. No.: WO2019/106132
PCT Pub. Date: Jun. 6, 2019

(65) Prior Publication Data
US 2020/0349418 A1    Nov. 5, 2020

Related U.S. Application Data

(60) Provisional application No. 62/593,219, filed on Nov. 30, 2017.

(51) Int. Cl.
G06N 3/063    (2023.01)
G06N 3/047    (2023.01)
(Continued)

(52) U.S. Cl.
CPC ............. G06N 3/063 (2013.01); G06N 3/047 (2023.01); G06N 3/048 (2023.01); G06N 7/01 (2023.01)

(58) Field of Classification Search
CPC .......... G06N 3/063; G06N 3/047; G06N 7/01; G06N 3/048
See application file for complete search history.

(56) References Cited

PUBLICATIONS

M. I. Jordan and R. A. Jacobs, "Hierarchical mixtures of experts and the EM algorithm," Proceedings of 1993 International Conference on Neural Networks (IJCNN-93-Nagoya, Japan), Nagoya, Japan, 1993, pp. 1339-1344 vol. 2, doi: 10.1109/IJCNN.1993.716791. (Year: 1993).*

(Continued)

*Primary Examiner* — Kakali Chaki
*Assistant Examiner* — Johnathan R Germick
(74) *Attorney, Agent, or Firm* — Fish & Richardson P.C.

(57) ABSTRACT

Methods, systems, and apparatus, including computer programs encoded on computer storage media, for a neural network system comprising one or more gated linear networks. A system includes: one or more gated linear networks, wherein each gated linear network corresponds to a respective data value in an output data sample and is configured to generate a network probability output that defines a probability distribution over possible values for the corresponding data value, wherein each gated linear network comprises a plurality of layers, wherein the plurality of layers comprises a plurality of gated linear layers, wherein each gated linear layer has one or more nodes, and wherein each node is configured to: receive a plurality of inputs, receive side information for the node; combine the plurality of inputs according to a set of weights defined by the side information, and generate and output a node probability output for the corresponding data value.

20 Claims, 4 Drawing Sheets

(51) Int. Cl.
G06N 3/048 (2023.01)
G06N 7/01 (2023.01)

(56) References Cited

PUBLICATIONS

Arnold et al., "A corpus for the evaluation of lossless compression algorithms," Proceedings of the Data Compression Conference, 1997, 10 pages.
Bachman et al., "An architecture for deep, hierarchical generative models," Advances in Neural Information Processing Systems, 2016, 9 pages.
Baldi et al., "Neural networks and principal component analysis: Learning from examples without local minima," Neural Networks, 1989, 2(1):53-58.
Balduzzi, "Deep online convex optimization with gated games," CoRR, 2016, arXiv:1604.01952.
Chen et al., "Variational lossy autoencoder," CoRR, 2016, arXiv:1611.02731.
Foerster et al., "Input switched affine networks: An RNN architecture designed for interpretability," Presented at the 34th International Conference on Machine Learning, Proceedings of Machine Learning Research, International Convention Centre, Sydney, Australia, Aug. 11, 2017, 70:1136-1145.
Fsix.github.io [online] "Deskewing," retrieved on Jun. 22, 2020, retrieved from URL>https://fsix.github.io/mnist/Deskewing.html, 7 pages.
Genest et al., "Combining probability distributions: A critique and an annotated bibliography," Statistical Science, 1986, 1(1):114-135.
Gregor et al., "Draw: A recurrent neural network for image generation," Proceedings of the 32nd International Conference on Machine Learning (ICML-15), Lille, France, 2015, 10 pages.
Gulrajani et al., "Pixelvae: A latent variable model for natural images," CoRR, 2016, http://arxiv.org/abs/1611.05013.
Guthrie et al., "A closer look at skip-gram modelling," LREC, 2006, 6:1222-1225.
Hazan et al., "Logarithmic regret algorithms for online convex optimization," Machine Learning, 2007, 69(2-3):169-192.
Hazan, "Introduction to online convex optimization," Foundations and Trends in Optimization, 2016, 2(3-4):157-325.
Herbster et al., "Warmuth. Tracking the best expert," Machine Learning, 1998, 32(2):151-178.
Hinton, "Training products of experts by minimizing contrastive divergence," Neural Computation, 2002, 14(8):1771-1800.
Hornik, "Approximation capabilities of multilayer feedforward networks," Neural networks, 1991, 4(2):251-257.
Hu et al., "Computation of matrix chain products," SIAM Journal on Computing, 1982, 11(2):362-373.
Jacobs et al., "Adaptive mixtures of local experts," Neural Computation, 1991, 3(1):79-87.
Jun et al., "Improved strongly adaptive online learning using coin betting," PMLR, 2017, 54:943-951.
Knoll et al., "A Machine Learning Perspective on Predictive Coding with PAQ8," Data Compression Conference, Apr. 2012, pp. 377-386.
Larochelle et al., "The neural autoregressive distribution estimator," Proceedings of the Fourteenth International Conference on Artificial Intelligence and Statistics, PMLR, 2011, 15:29-37.
Lecun et al., "Gradient-based learning applied to document recognition," In Proceedings of the IEEE, 1998, 86(11):2278-2324.
Luo et al., "Efficient second order online learning by sketching," Advances in Neural Information Processing Systems 29, NIPS, 2016, pp. 902-910.
Mahoney, "Adaptive weighing of context models for lossless data compression," Technical Report, Florida Institute of Technology CS, 2005, 6 pages.
Mahoney, "Fast text compression with neural networks," FLAIRS Conference, 2000, 5 pages.
Mattern et al., "Linear and geometric mixtures—analysis," 2013 Data Compression Conference, Mar. 2013, pp. 301-310.
Mattern et al., "Mixing strategies in data compression," 2012 Data Compression Conference, Apr. 2012, pp. 337-346.
Mattern, "On Statistical Data Compression," Dissertation, Technische Universität Ilmenau, Fakultät für Informatik und Automatisierung, Sep. 22, 2015, 183 pages (English abstract).
Mattmahoney.net [online], "Data Compression Explained," May 2012, retrieved on Jul. 27, 2020, retrieved from URL<https://pdfs.semanticscholar.org/6857/266d75bb58412aeaa61b39423f88dce209a2.pdf>, 32 pages.
Metwally et al., "Efficient Computation of Frequent and Top-k Elements in Data Streams," Lecture Notes in Computer Science, 2004, pp. 398-412.
Ostrovski et al., "Count-based Exploration with neural density models," CoRR, 2017, https://arxiv.org/abs/1703.01310, 15 pages.
PCT International Preliminary Report on Patentability in International Appln. No. PCT/EP2018/083094, dated Jun. 2, 2020, 9 pages.
PCT International Search Report and Written Opinion in International Appln. No. PCT/EP2018/083094, dated Mar. 4, 2019, 15 pages.
Prize.hutter1.net [online], "Hutter Prize," last updated Feb. 2020, retrieved on Jul. 27, 2020, retrieved from URL<http://prize.hutter1.net/>, 3 pages.
Rumelhart et al., "Learning Representations by Back-propagating Errors," Nature, 1986, 323:533-536.
Saxe et al., "Exact solutions to the nonlinear dynamics of learning in deep linear neural networks," CoRR, 2013, https://arxiv.org/abs/1312.6120, 22 pages.
Schmidhuber et al., "Sequential neural text compression," IEEE Transactions on Neural Networks, 1996, 7(1):142-146.
Sutskever et al., "Generating Text with Recurrent Neural Networks," ICML 2011, Jul. 2011, 8 pages.
Van Den Oord et al., "Pixel recurrent neural networks," ICML'16: Proceedings of the 33rd International Conference on International Conference on Machine Learning, 2016, 48:1747-1756.
Van Erven et al., "Catching up faster in bayesian model selection and model averaging," Advances in Neural Information Processing Systems 20, Proceedings of the Twenty-First Annual Conference, Dec. 3-6, 2007, 8 pages.
Veness et al., "Compress and control," Proceedings of the Twenty-Ninth AAAI Conference on Artificial Intelligence, Jan. 25-30, 2015, pp. 3016-3023.
Veness et al., "Context tree switching," 2012 Data Compression Conference, Apr. 10-12, 2012, 327-336.
Veness et al., "Online Learning with Gated Linear Networks," CoRR, 2017, https://arxiv.org/abs/1712.01897, Dec. 2017, 40 pages.
Warmuth et al., "Tracking the best expert," Machine Learning, 1998, 32(2):151-178.
Willems et al., "The context-tree weighting method: Basic properties," IEEE Information Theory Society Newsletter, 1997, 41(3):653-664.
Witten et al., "Arithmetic coding for data compression," Communications of the ACM, Jun. 1987, 30(6):520-540.
www.byronknoll.com/cmix.html [online], "CMIX," Apr. 27, 2014, retrieved on Jul. 27, 2020, retrieved from URL<http://www.byronknoll.com/cmix.html>, 8 pages.
Zinkevich, "Online Convex Programming and Generalized Infinitesimal Gradient Ascent," Machine Learning, Proceedings of the Twentieth International Conference, Aug. 2003, pp. 928-936.

* cited by examiner

GATED LINEAR NETWORKS

CROSS-REFERENCE TO RELATED APPLICATION

This application is a National Stage Application under 35 U.S.C. § 371 and claims the benefit of International Application No. PCT/EP2018/083094, filed Nov. 30, 2018, which claims the benefit of the filing date of U.S. Application No. 62/593,219, filed on Nov. 30, 2017. The disclosure of the foregoing applications are hereby incorporated by reference.

BACKGROUND

This specification relates to neural network systems, particularly ones which are capable of rapid online learning.

Neural networks are machine learning models that employ one or more layers of units or nodes to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural network system implemented as computer programs on one or more computers in one or more locations that, in some implementations, is capable of rapid online learning, although the system can also be used where online learning is not needed. Unlike conventional neural networks in some implementations the nodes (also referred to as "neurons") or units may define a linear network and the representational power when approximating a complex function may come from additional "side" information used to gate the nodes. Further, in some implementations rather than the network as a whole predicting a target each neuron may probabilistically predict the target. That is, each neuron in the network generates a prediction of the target output for the network, i.e., rather than only the output layer of the network generating the prediction. Thus learning, e.g., the updating of weights, may be local to a neuron based on the prediction generated by that neuron, and can be potentially in parallel and/or distributed, rather than relying upon backpropagation.

Thus in one aspect a neural network system implemented on one or more computers may comprise one or more neural networks, each comprising a plurality of layers arranged in a hierarchy of layers, each layer having a plurality of nodes. An input to the neural network system is referred to as a "system input", which is transmitted to each of the neural networks as an input. Each node in a layer may have an output, a plurality of inputs coupled to the outputs of some or all the nodes in a preceding ("lower") layer in the hierarchy of layers, and a side gate coupled to the system input. Each node in the layer may be configured to combine the plurality of inputs according to a set of weights defined by the side information and to output a probability value representing the probability of a target data value for the neural network conditioned upon the side information. There may be a system output from one, or potentially more than one, of the nodes of an upper layer in the hierarchy of layers. That is, the prediction generated by one or more nodes in the highest layer of the hierarchy is the output of the neural network.

In particular, in some cases, the system generates a respective probability distribution over possible values for each of multiple data values in an output of the system (an "output data sample") and each neural network in the system generates the probability distribution for a respective one of the data values. For example, if the output of the system is an image, each neural network can generate a probability distribution over possible color values for a respective pixel of the image or for a respective color channel of a respective pixel of the image.

In some implementations each of the plurality of inputs represents a probability value and each node is configured to combine the plurality of inputs according to a geometric mixture model. In this way the nodes may work together so that nodes in one layer can improve the predictions of nodes in a previous layer rather than acting as a non-linear feature extractor.

Such a geometric mixture model may involve each node applying a non-linear function to each of the plurality of inputs before they are combined, and then applying an inverse of the non-linear function to the weighted combination before providing the node output. Thus unlike conventional neurons the nodes may implement an overall linear network, with richness of representations coming from the side gating. The non-linear function may comprise a logit function and the inverse non-linear function may comprise a sigmoid function.

The side gate of each node may be configured to apply a respective context function to the side information to determine a context value. The node may then select a set of weights dependent upon the context value. For example, the node may select a row of weights from a weight matrix for the node based upon the context value. The context function may partition the side information (that is, the space of side information) into two or more regions either linearly or according to some complex boundary which may be defined by a kernel or map, which may be learned. In general the different nodes may have different context functions; these different functions may have the same form and different parameterization. The context functions may define regions or ranges, which accumulate across nodes, over which the system learns to define the output value.

The neural network may have a base layer of nodes defining base probability values for input to the nodes of the first layer in the hierarchy. The base probability values may, for example, be fixed or only dependent on the side information. This base layer may effectively be used to initialize the network. Alternatively, the base layer may be conditioned on different information than the gated linear layers in the network. For example, in an image generation task, the base layer for a network assigned to a particular pixel may be conditioned on features of color values already generated for earlier pixels in the image.

In some implementations the side information, and system output, may each comprise a sequence of data values, for example a time sequence.

The system may include a controller to implement an online training procedure in which weights of the set of weights are adjusted during output of the sequence of data values in response to a loss dependent upon an observed data value for each step in the sequence of data values. The update may depend on the gradient of a loss, which may depend upon the observed data value, a predicted probability of the observed value, and the side value, each for a step in the sequence. For example, the loss may be proportional to the logarithm of the probability of the observed data value according to the probability distribution defined by the node probability output. The loss and the training may be local, in that the loss used to update the weights of a given node may depend only on the probability generated by a given node, the weights for the given node, and observed value for the target. Any of a range of online convex programming techniques may be employed, for example algorithms of the "no-regret" type. One technique which may be employed for updating the weights is Online Gradient Ascent/Descent (Zinkevich, 2003).

During training, whether or not online, the system may treat the nodes as an ensemble of models, more particularly a sequence of an ensemble of models. These may be weighted using switching weights so that as the model learns the better models or nodes are given relatively higher weights. This can help to ensure that at each step of a learning sequence the more accurate predictions are relied upon most, which can thus increase learning speed and output accuracy.

Implementations of the system have many applications. In broad terms the system can be used to determine a probability density function, for example for a sequence of data items. The sequence of data items may represent, for example, a still or moving image, in which case values of the data may represent pixel values; or sound data, for example amplitude values of an audio waveform; or text data, for example a text string or other word representation; or object position/state/action data, for example for a reinforcement learning system; or other data, for example atomic position data for a molecule.

The system may be used directly as a generative model, for example to generate examples conditioned upon the side information. Alternatively, it may be used to score the quality of already generated examples, i.e., in terms of how well the examples match the training data.

Alternatively it may be employed as a classifier, to produce a probability conditional upon a side information input, for example an image. For example, the neural network system may be used to classify images (e.g. of a real-world of simulated environment) into one of a predetermined plurality of classes.

Alternatively, the neural network system may be used for reinforcement learning, for example to generate control data for controlling an agent (e.g. a robot) moving in a real-world or simulated environment, or data predicting a future image or video sequence seen by a real or virtual camera associated with a physical object or agent in a simulated or real-world environment. In reinforcement learning the side information may include one or more previous image or video frames seen by the camera. The learned probability density may be used directly for probabilistic planning and/or state space exploration in a simulated or real-world environment at least part of which is imaged by the camera (a "visual environment").

Some example implementations are described using binary data. That is, the claimed "probability outputs" are single probability values that represent the likelihood that the value of the corresponding data sample is a particular one of the two possible values. However examples of the system may be used with continuous valued data, for example by thresholding. More generally the examples described using a binary distribution may be extended to a binomial distribution for multi-bit binary values, or even to continuous data, for example based upon Gaussian distributions.

The subject matter described in this specification can be implemented in particular embodiments so as to realize one or more of the following advantages. The described systems and methods can learn online, that is the training process can be performed while generating a sequence of output data values, with the output data values being successively better attempts to perform the desired computational task. The learning can be very fast, that is requiring fewer processing power and less training data than other approaches. Accordingly, the local learning can be performed on a mobile device or other resource-constrained computing environment rather than needing to train the system using a large amount of computing resources, e.g., in a data center. The learning of weights converges under a wide range of conditions and the system can thus learn from sub-optimal training data such as data which includes correlated examples. Furthermore, in contrast to many neural network training techniques, given a sufficiently large network size the convergence is guaranteed to be to state of the neural network system which performs any computational task defined by a continuous density function, to an arbitrary level of accuracy. Learning, that is updating the weights, can be local and thus there is no need to communicate between neurons when updating. This facilitates a parallel, distributed implementation of the system. The weight updating is also computationally efficient and easily implemented on a GPU (Graphics Processing Unit) or other special-purpose hardware. Additionally, the gated linear network itself may be particularly suited to being implemented in special-purpose hardware, e.g., hardware that performs matrix multiplications in hardware, e.g., a Tensor Processing Unit (TPU) or another hardware machine learning accelerator.

BRIEF DESCRIPTION OF THE DRAWINGS

Examples of the present disclosure will now be described for the sake of example only with reference to the following figures, in which.

DETAILED DESCRIPTION OF THE EXAMPLES

Figure 1:
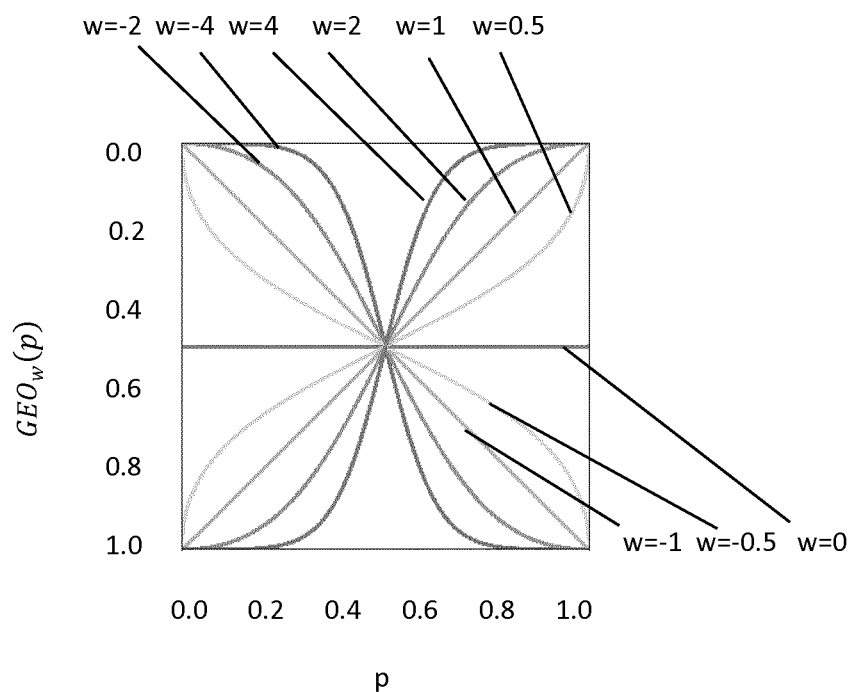
FIG. 1 illustrates a function used by a neuron in a neural network system according to the present disclosure.

Firstly we will define some notation. We then review the concept of geometric mixing, an adaptive online ensemble technique from the output of multiple models. We then describe the properties of a logarithmic loss function. We then describe the example of the disclosure.

1. Notation

Let $\Delta_d = \{x \in [0,1]^d : \|x\|_1 = 1\}$ be the d dimensional probability simplex embedded in $\mathbb{R}^{d+1}$ and $\mathcal{B} = \{0,1\}$ be the set of binary elements. The indicator function for set A is $\mathbb{I}_A$ and satisfies $\mathbb{I}_A(x) = 1$ if $x \in A$ and $\mathbb{I}_A(x) = 0$ otherwise. For predicate P we also write $\mathbb{I}[P]$, which evaluates to 1 if P is true and 0 otherwise. The scalar element located at position (i,j) of a matrix A is $A_{ij}$, with the i-th row and j-th column denoted by $A_{i*}$ and $A_{*j}$ respectively. For functions $f: \mathbb{R} \to$ $\mathbb{R}$ and vectors $x \in \mathbb{R}^d$ we adopt the convention of writing $f(x) \in \mathbb{R}^d$ for the coordinate-wise image of x under f so that $f(x)=(f(x_i), \ldots, f(x_d))$.

If $p, q \in [0, 1]$, then $D(p, q)=p \log p/q+(1-p) \log (1-p)/(1-q)$ is the Kullback-Leibler (KL) divergence between Bernoulli distributions with parameters p and q respectively. Let $\chi$ be a finite, non-empty set of symbols, which we call the alphabet. A string of length n over $\chi$ is a finite sequence $x_{1:n}=x_1 x_2 \ldots x_n \in \chi^n$ with $x_t \in \chi$ for all t. For $t \le n$ we introduce the shorthands $x_{<t}=x_{1:t-1}$ and $x_{\le t}=x_{1:t}$. The string of length zero is $\in$ and the set of all finite strings is $\chi^*=\{\in\} \cup \bigcup_{i=1}^\infty \chi^i$. The concatenation of two strings s, $r \in \chi^*$ is denoted by sr.

A sequential, probabilistic model $\rho$ is a probability mass function $\rho: \chi^* \to [0,1]$, satisfying the constraint that $\rho(x_{1:n})=\Sigma_{y \in \chi} \rho(x_{1:n}y)$ for all $n \in N$, $x_{1:N} \in \chi^n$, with $\rho(\in)=1$. Under this definition, the conditional probability of a symbol $x_n$ given previous data $x_{<n}$ is defined as $\rho(x_n|x_{<n})=\rho(x_{1:n})/\rho(x_{<n})$ provided $\rho(x_{<n})>0$, with the familiar chain rules $\rho(x_{1:n})=\Pi_{i=0}^n \rho(x_i|x_{<i})$ and $\rho(x_{i:j}|x_{<i}|x_{<i})=\Pi_{k=i}^j \rho(x_k|x_{<k})$ applying as usual.

2. Geometric Mixing

Given m sequential, probabilistic, binary models $\rho_1, \ldots, \rho_m$, geometric mixing provides a principled way of combining the m associated conditional probability distributions into a single conditional probability distribution, giving rise to a probability measure on binary sequences that has a number of desirable properties. Let $x_t \in \{0, 1\}$ denote a Boolean target at time t. Furthermore, let $p_t=(\rho_1(x_t=1|x_{<t}), \ldots, \rho_m(x_t=1|x_{<t}))$. Given a convex set $\mathcal{W} \subset \mathbb{R}^m$ and a parameter vector $w \in \mathcal{W}$ the Geometric Mixture is defined by:

$$GEO_w(x_c = 1; p_t) = \frac{\prod_{i=1}^m p_{t,i}^{w_i}}{\prod_{i=1}^m p_{t,i}^{w_i} + \prod_{i=1}^m (1-p_{t,i})^{w_i}}, \quad (1)$$

with $GEO_w(x_t=0; p_t)=1-GEO_w(x_t=1; p_t)$.

Setting $w_i=1/m$ for $i \in [1, m]$ is equivalent to taking the geometric mean of the m input probabilities. As illustrated in FIG. 1, higher absolute values of $w_i$ translate into an increased belief in the i-th model prediction; for negative values of $w_i$, the prediction needs to be reversed. If $w=0$ then $GEO_w(x_t=1; p_t)=½$; and in the case where $w_i=0$ for $i \in S$ where $S$ is a proper subset of [1, m], the contributions of the models in $S$ are essentially ignored (taking $0^0$ to be 1). Due to the product formulation, every model also has "the right of veto", in the sense that a single $p_{t,i}$ close to 0 coupled with a $w_i>0$ drives $GEO_w(x_t=1; p_t)$ close to zero. These properties are graphically depicted in FIG. 1.

Via simple algebraic manipulation, one can also express Eqn. (1) as:

$$GEO_w(w_t=1;p_t)=\sigma(w.\text{logit}(p_t)), \quad (2)$$

where $$\sigma(x) = \frac{1}{(1+e^{-x})}$$

denotes the sigmoid function, and $\text{logit}(x)=\log(x/(1-x))$ is its inverse. This form is well suited for numerical implementation. Furthermore, the property of having an input non-linearity that is the inverse of the output non-linearity means that a linear network is obtained when layers of geometric mixers are stacked on top of each other.

3. Logarithmic Loss

We assume a standard online learning setting, whereby at each round $t \in N$ a predictor outputs a binary distribution $q_t: B \to [0, 1]$, with the environment responding with an observation $x_t \in B$. The predictor then suffers the logarithmic loss $$l_{t(q_t,x_t)}=-\log q_t(x_t),$$

before moving onto round t+1. The loss will be close to 0 when the predictor assigns high probability to $x_t$, and large when low probability is assigned to $x_t$. In the extreme cases, a zero loss is obtained when $q_t(x_t)=1$, and an infinite loss is suffered when $q_t(x_t)=0$. In the case of geometric mixing, which depends on both the m dimensional input predictions $p_t$ and the parameter vector $w \in W$, we abbreviate the loss by defining $$l_t^{GEO}(w)=l_t(GEO_w(\cdot;p_t),x_t). \quad (3)$$

Figure 2:
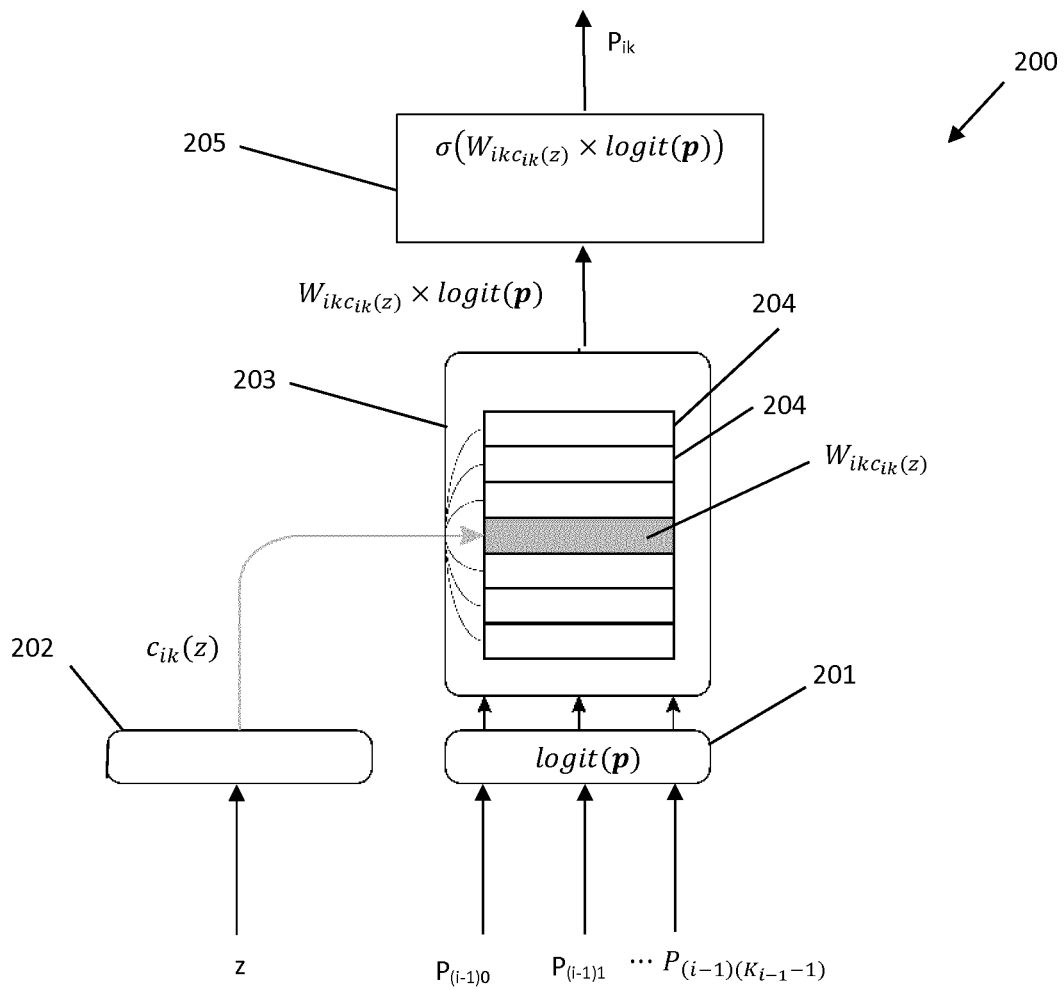
FIG. 2 illustrates the operation of a certain neuron of a gated linear network included in a neural network system according to the present disclosure, specifically the k-th neuron in layer i of the gated linear network, where i is greater than zero.
Figure 3:
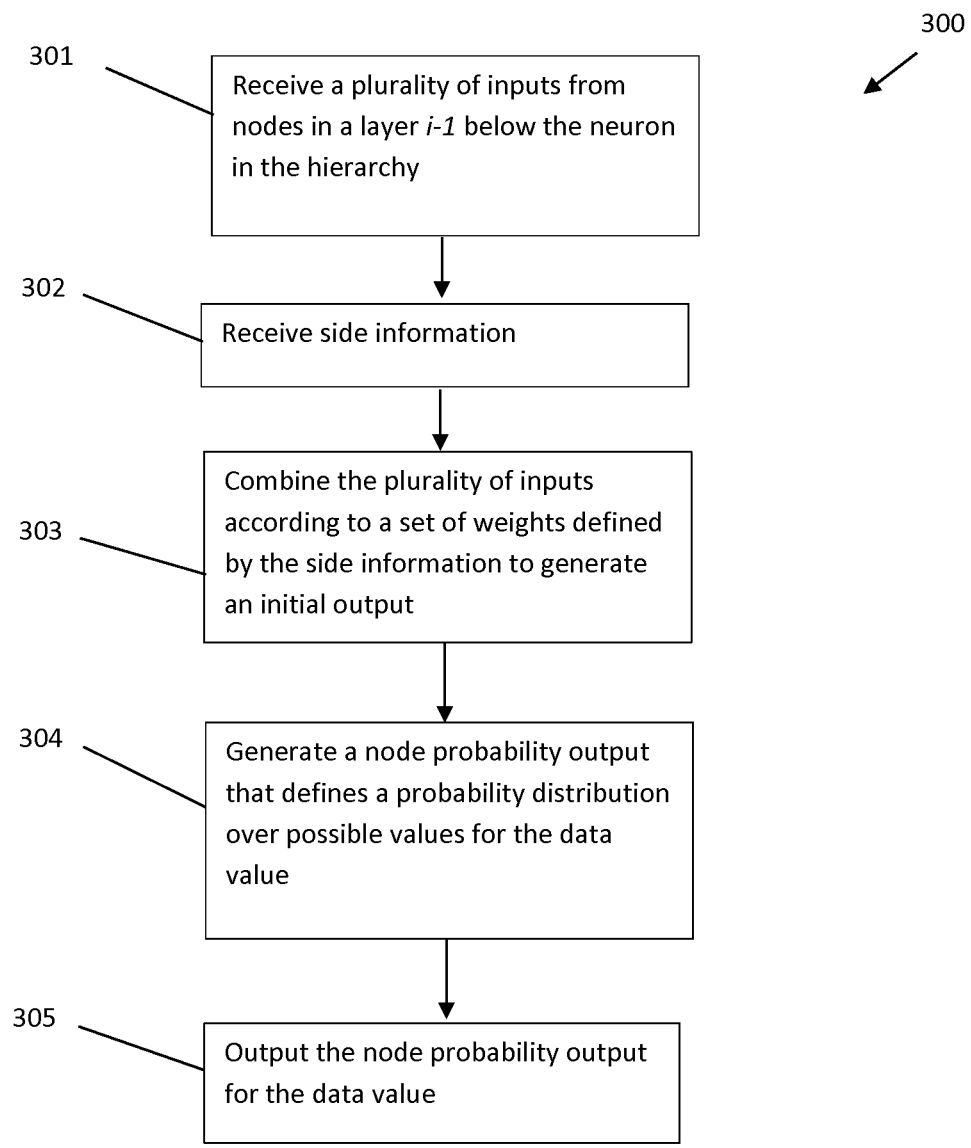
FIG. 3 is a flow diagram of the method carried out by the neuron of FIG. 2.
Figure 4:
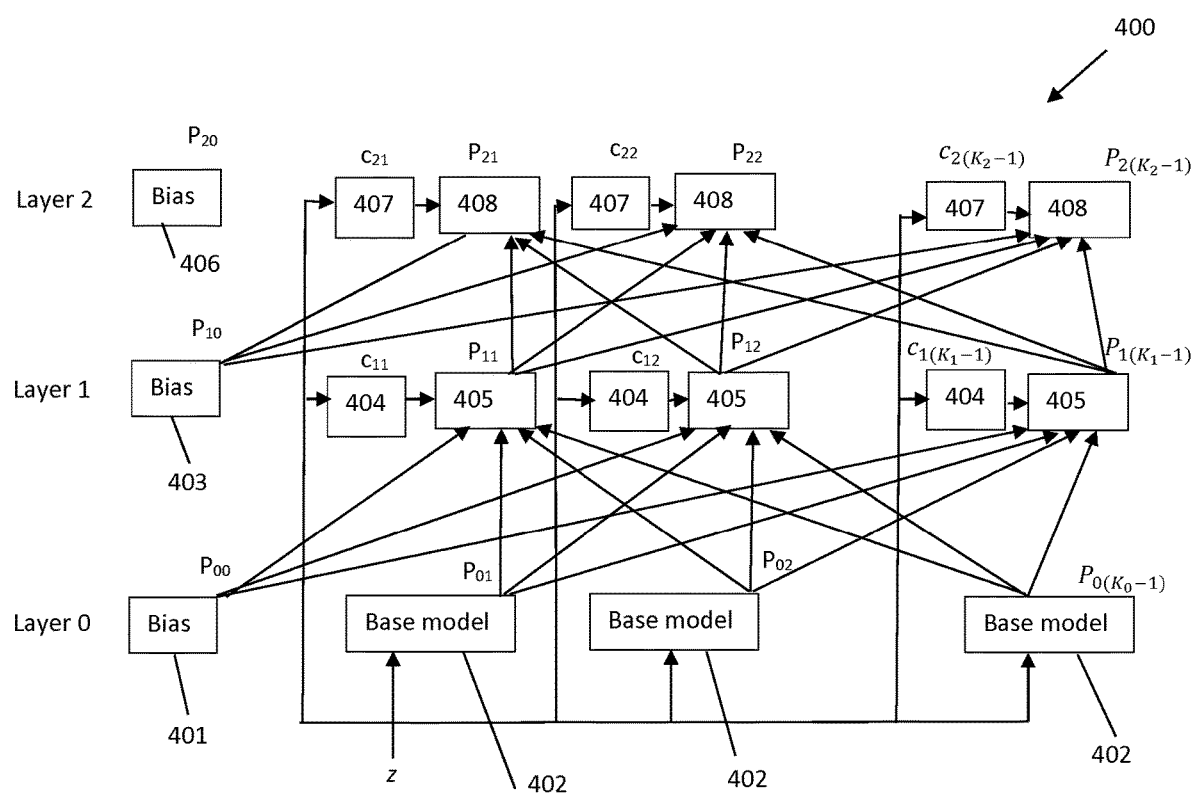
FIG. 4 illustrates the bottom 3 layers of a gated linear network according to the present disclosure, comprising multiple layers of neurons as shown in FIG. 2.

The properties of $l_t^{GEO}(w)$ it straightforward to minimize it by adapting w at the end of each round, such as by Online Gradient Descent. Alternatively, second order techniques may be used, such as Online Newton Step (Hazan et al., 2007) and its sketched variants 4. A Neuron of the Example FIG. 2 illustrates the operation of a single neuron (or "node") 200 of the example of a neural network system according to the present disclosure. FIG. 3 illustrates the steps of a method 300 performed by the neuron 200. The neuron 200 is part of a gated linear network 400, part of which is shown in FIG. 4. The gated linear network 400 is one of one or more gated linear networks in a neural network system according to the present disclosure. Each gated linear network is used for generating at least one data value, such that the set of one or more gated linear networks generate respective data values.

As described in more detail below, the gated linear network 400 contains layers L+1 layers indexed by an integer index $i \in \{0, \ldots, L\}$, with K models in each layer labelled by the integer variable k. As described below, one of these models may be a bias model, and, except for i=0, the other $K_i-1$ of these models are neurons having the same general form as neuron 200. Layers $1, \ldots, L$ are "gated linear layers", which form a hierarchy of layers, in which layer i is "higher" than layer i-1. FIG. 2 illustrates a neuron 200 which is the k-th neuron in a gated linear layer i of the gated linear network 400, where i is greater than zero.

The neuron 200 operates as a gated geometric mixer which combines a contextual gating procedure with geometric mixing. Here, contextual gating has the intuitive meaning of mapping particular examples to particular sets of weights.

The neuron 200 comprises an input unit 201 which (in step 301) receives $K_{i-1}$ inputs which are respective outputs of the $K_{i-1}$ models in the row below (i.e. the row i-1). These are denoted $P_{(i-1)0}, P_{(i-1)1}, \ldots, P_{(i-1)(K_{i-1}-1)}$. There may be denoted as the vector p.

The neuron 200 further comprises a side gate 202 which (in step 302) receives side information z.

In step 303, the side gate 202 of neuron 200 applies a respective context function (described below) to the side information to derive a context value $c_{ik}(z)$. A weighting unit 203 is configured to select a set of weights $W_{ikc_{ik}(z)}$ dependent upon the context value $c_{ik}(z)$. This is illustrated schematically in FIG. 2 as the weighting unit 203 selecting the set of weights $W_{ikc_{ik}(z)}$ from a plurality of sets of weights which are illustrated as the respective rows 204 of a table. The input unit 201 is configured to generate from the vector p, the vector logit (p), where logit(x) denotes log(x/1−x). The weighting unit 203 is configured to generate an initial output as $W_{ikc_{ik}(z)} \times \text{logit}(p)$.

In step 304, an output unit 205 of the neuron 200 generates a node probability output $P_{ik} = \sigma(W_{ikc_{(z)}} \times \text{logit}(p))$ which is a probability distribution over possible values for the data value corresponding to the gated linear network of which the neuron 200 is a component.

In step 305, the output unit 205 outputs the node probability output $P_{ik}$ for the corresponding data value.

To express this in more detail, associated with each neuron 200 is a respective context function c: $\mathcal{Z} \to \mathcal{C}$ where $\mathcal{Z}$ is the set of possible side information and $\mathcal{C} = \{0, \ldots, k-1\}$ for some $k \in \mathbb{N}$ is the context space. Given a convex set $\mathcal{W} \subset \mathbb{R}^d$, each neuron 200 is parametrized by a respective matrix $$W = \begin{bmatrix} w_0 \\ \vdots \\ w_{k-1} \end{bmatrix}$$

with each row vector $w_i \in \mathcal{W}$ for $0 \le i < k$. The context function c is responsible for mapping a given piece of side information $z_t \in \mathcal{Z}$ to a particular row $w_{c(z_t)}$ of W, which we then use with standard geometric mixing. More formally, we define the gated geometric mixture prediction as $$GEO^c_W(x_t = 1; p_t, z_t) = GEO_{w_{c(z_t)}}(x_t = 1; p_t) \quad (4)$$

with $GEO^c_W(x_t=0; p_t, z_t) = 1 - GEO^c_W(x_t=1; p_t, z_t)$. Once again we have the following equivalent form $$GEO^c_W(x_t=1; p_t, z_t) = \sigma(w_{c(z_t)} \cdot \text{logit}(p_t)). \quad (5)$$

The key idea is that the neuron 200 can specialize its weighting of the input predictions based on some property of the side information $z_t$. The side information can be arbitrary, for example it may comprise one or more additional input features. Alternatively or additionally, it may be a function of $p_t$. The choice of context function is informative in the sense that it simplifies the probability combination task.

5. Context Functions

Here we introduce several classes of general purpose context functions. All of these context functions take the form of an indicator function $\mathbb{I}_S(z)$: $\mathcal{Z} \to \mathcal{B}$ on a particular choice of set $S \subseteq \mathcal{Z}$, with $\mathbb{I}_S(z) := 1$ if $z \in S$ and 0 otherwise. In variants of the example, other context functions can be used, such as one which is selected in view of the task the trained network is to perform.

A. Half-space contexts This choice of context function is useful for real-valued side information. Given a normal $v \in \mathbb{R}^d$ and an offset $b \in \mathbb{R}$, consider the associated affine hyperplane $\{x \in \mathbb{R}^d : x \cdot v = b\}$. This divides $\mathbb{R}^d$ in two, giving rise to two half-spaces, one of which we denote $H_{v,b} = \{x \in \mathbb{R}^d : x \cdot v > b\}$. The associated half-space context is then given by $\mathbb{I}_{H_{v,b}}(z)$.

B. Skip-gram contexts The following type of context function is useful when we have multi-dimensional binary side information and can expect single components of $\mathcal{Z}$ to be informative. If $\mathcal{Z} = \mathcal{B}^d$, given an index $i \in [1, d]$, a skip-gram context is given by the function $\mathbb{I}_{S_i}(z)$ where $S_i := \{z \in \mathcal{Z} : z_i = 1\}$. One can also naturally extend this notion to categorical multi-dimensional side information or real valued side information by using thresholding.

6. Context Function Composition

Richer notions of context can be created from composition. In particular, any finite set of d context functions $\{c_i: \mathcal{Z} \to \mathcal{C}_i\}_{i=1}^d$ with associated context spaces $\mathcal{C}_1, \ldots, \mathcal{C}_d$ can be composed into a single higher order context function c: $\mathcal{Z} \to \mathcal{C}$, where $\mathcal{C} = \{0, 1, \ldots, -1 + \Pi_{i=1}^d |\mathcal{C}_i|\}$ by defining $$c(z) = \sum_{i=1}^d c_i(z) \left( \prod_{j=i+1}^d |C_j| \right)$$

For example, we can combine four different skip-gram contexts into a single context function with a context space containing 16 elements. The combined context function partitions the side information based on the values of the four different binary components of the side information.

7. Gated Linear Network

We now describe a neural network which is an example of the present disclosure. The neural network is termed a gated linear network (GLN), and is one network out of one or more networks which compose a neural network system according to the present disclosure. It is a feed-forward network composed of a plurality (hierarchy) of gated linear layers of gated geometric mixing neurons 200. The GLN also includes a base layer (layer 0, that is i=0). Each neuron 200 in a given gated linear layer outputs a gated geometric mixture over the predictions from the previous layer, with the final layer typically consisting of just a single neuron that determines the output of the entire network.

FIG. 4 illustrates the bottom three layers (that is layer 0, layer 1 and layer 2) in the gated linear network 400. Each of the layers 1 and 2 is a gated linear layer. The input to the gated linear network (the "system input") is denoted z.

The zero-th layer (also called here the "base layer", or "layer 0") includes a bias unit 401 which generates an output $P_{00}$ (typically dependent upon z), and $K_0 - 1$ base models 402, which each perform different functions of the input z to generate respective outputs $P_{01}, P_{02}, \ldots P_{0(K_0-1)}$. The respective functions performed by the base models 402 are not varied during the training procedure.

Layer 1 of the gated linear network 400 comprises a bias unit 403, which generates an output $P_{10}$ (typically dependent upon z). It further comprises $K_1 - 1$ neurons each of which has the structure of the neuron 200 of FIG. 2. The side gates 202 of these neurons are denoted 404 in FIG. 4, and the units 201, 203, 205 of the neuron 200 are denoted as a unit 405 in FIG. 4. The $K_1 - 1$ side gates 404 receive the side information z and produce the respective context values $c_{11}, c_{12}, \ldots c_{1(K_1-1)}$. The respective units 405 use this, and the outputs of the bias unit 401 and all the base models 402, to generate respective outputs $P_{11}, P_{12}, \ldots, P_{1(K_1-1)}$.

Layer 2 of the gated linear network 400 comprises a bias unit 406, which generates an output $P_{20}$. It further comprises $K_2 - 1$ neurons each of which has the structure of the neuron 200 of FIG. 2. The side gates 202 of these neurons are denoted 407 in FIG. 4, and the units 201, 203, 205 of the neuron 200 are denoted as a unit 408 in FIG. 4. The $K_2 - 1$ side gates 407 receive the side information z and produce the respective context values $c_{21}, c_{22}, \ldots c_{2(K_2-1)}$. The respective units 408 use this, and the outputs of the bias unit 403 and all the units 405, to generate respective outputs $P_{21}$, $P_{22}$, ..., $P_{2(K_2-1)}$.

Note that the gated linear network contains higher layers (i.e. gated linear layers above 2) which are omitted from FIG. 4 for simplicity. Each of these layers (except the top one) comprises a bias unit, and one or more neurons having the structure of the neuron 200, each of those neurons receiving the input signal z to their respective side gates, and the outputs of the bias unit and neurons of the layer immediately below to their respective input unit.

In the top layer (not shown in FIG. 4), there is only a single neuron, having the structure of the neuron 200 of FIG. 2. This neuron receives the input signal z to its side gate, and the outputs of the bias unit and all the neurons of the layer immediately below to its input unit. The neuron outputs the final output of the gated linear network.

We now express this concept mathematically. Once again let $\mathcal{Z}$ denote the set of possible side information and $\mathcal{C} \subset \mathbb{N}$ be a finite set called the context space. A GLN is a network of sequential, probabilistic models organized in $L+1$ layers indexed by $i \in \{0, \ldots, L\}$, with $K_i$ models (neurons) in each layer. Models are indexed by their position in the network when laid out on a grid; for example, $\rho_{ik}$ will refer to the k-th model in the i-th layer. The zeroth layer of the network is called the base layer and is constructed from $K_0$ probabilistic base models $\{\rho_{0k}\}_{k=0}^{k_0-1}$ of the form given in the above "notation" section. Any base models may be used in the example network, since each of their predictions may be assumed to be a function of the given side information and all previously seen examples.

The non-zero layers are composed of a bias unit 403, 406 and gated geometric mixing neurons 200 as shown in FIG. 2. Associated to each of these will be a fixed context function $c_{ik}: \mathcal{Z} \to \mathcal{C}$ that determines the behavior of the gating. In addition to the context function, for each context $c \in \mathcal{C}$ and each neuron $(i, k)$ there is an associated weight vector $w_{ikc} \in \mathbb{R}^{K_{i-1}}$ which is used to geometrically mix the inputs. Each bias unit 403, 406 a non-adaptive bias model on every layer, which will be denoted by $\rho_{i0}$ for each layer i. Each of these bias models corresponds to a Bernoulli Process with parameter $\beta$. These bias models play a similar role to the bias inputs in MLPs.

Given a $z \in \mathcal{Z}$, a weight vector for each neuron is determined by evaluating its associated context function. The output of each neuron is described inductively in terms of the outputs of the previous layer. To simplify the notation, we assume an implicit dependence on $x_{<t}$ and let $p_{ij}(z) = \rho_{ij}(x_t=1|x_{<t}; z)$ denote the output of the j-th neuron in the i-th layer, and $p_i(z) = (p_{i0}(z), p_{i1}(z), \ldots, p_{iK_i}(z))$ the output of the i-th layer. The bias output for each layer is defined to be $p_{i0}(z) = \beta$ for all $z \in \mathcal{Z}$, for all $0 \le i \le L+1$, where $\beta \in (0,1) \backslash \{½\}$. The constraint that $\beta$ is not equal to one half is made to ensure that the partial derivative of the loss with respect to the bias weight is not zero under geometric mixing. From here onwards we adopt the convention of setting $\beta = e/(e+1)$ so that $\text{logit}(\beta) = 1$.

For layers $i > 1$, the k-th node in the i-th layer receives as input the vector of dimension $K_{i-1}$ of predictions of the preceding layer, as shown in FIG. 4. The output of a single neuron 200 is the geometric mixture of the inputs with respect to a set of weights that depend on its context, namely $$p_{ik}(z) = \sigma(w_{ikc_{ik}}(z) \cdot \text{logit}(p_{i-1}(z)))$$

as illustrated by FIG. 2. The output of layer i can be re-written in matrix form as $$p_i(z) = \sigma(W_i(z) \text{logit}(p_{i-1}(z))), \quad (6)$$

where $W_i(z) \in \mathbb{R}^{K_i \times K_{i-1}}$ is the matrix with k-th row equal to $w_{ik}(z) = w_{ikc_{ik}(z)}$.

Iterating Eqn. (6) once gives $$p_i(z) = \sigma(W_i(z) \text{logit}(\sigma(W_{i-1}(z) \text{logit}(p_{i-2}(z))))).$$

Since logit is the inverse of $\sigma$, the i-th iteration of Eqn. (6) simplifies to $$p_i(z) = \sigma(W_i(z) W_{i-1}(z) \ldots W_1(z) \text{logit}(p_0(z))). \quad (7)$$

Eqn. (7) shows the network behaves like a linear network, but with weight matrices that are data-dependent. Without the data dependent gating, the product of matrices would collapse to single linear mapping, giving the network no additional modeling power over a single neuron.

We now describe how the weights are learnt in the GLN, that is the neural network 400 of FIG. 4. While architecturally a GLN appears superficially similar to the well-known multilayer perception (MLP), what and how it learns is very different. The key difference is that every neuron in a GLN probabilistically predicts the target. This makes it possible to associate a loss function to each neuron. This loss function will be defined in terms of just the parameters of the neuron itself; thus, unlike backpropagation, learning will be local. Furthermore, this loss function will be convex, which will allow us to avoid many of the difficulties associated with training typical deep architectures. For example, simple deterministic weight initializations may be performed, which aids the reproducibility of empirical results. In many situations, convergence to an optimal solution is guaranteed. The convexity also makes it possible to learn from correlated inputs in an online fashion without suffering significant degradations in performance. Furthermore, GLNs are extremely data efficient, and can produce state of the art results in a single pass through the data.

Each layer may be thought of as being responsible for trying to directly improve the predictions of the previous layer, rather than a form of implicit non-linear feature/filter construction as is the case with MLPs trained offline with back-propagation.

Optionally, the weights may be chosen satisfy the following mild technical constraints:
1. $w_{ikc0} \in [a, b] \subset \mathbb{R}$ for some real $a<0$ and $b>0$;
2. $w_{ikc} \in S \subset \mathbb{R}^{k_{i-1}}$ where S is a compact, convex set such that $\Delta_{k_{i-1}-1} \subset S$.

One natural way to simultaneously meet these constraints is to restrict each neuron's contextual weight vectors to lie within some (scaled) hypercube: $w_{ikc} \in [-b, b]^{K_{i-1}}$, where $b \ge 1$.

To discuss the training during a period of time indexed by a time value $t=1, \ldots$, we will use $w_{ijc}^{(t)}$ to denote the weight vector $w_{ijc}$ at time t. Each neuron will be solving an online convex programming problem, so initialization of the weights is straightforward and is non-essential to the theoretical analysis. Choices found to work well in practice are zero initialization (i.e. $w_{ikc}^{(1)}=0$ for all i, k and c), and geometric average initialization (i.e. $w_{ikc}^{(1)}=1/K_{i-1}$ for all i, k, and c).

The zero initialization can be seen as a kind of sparsity prior, where each input model is considered a-priori to be unimportant, which has the effect of making the geometric mixture rapidly adapt to incorporate the predictions of the best performing models. The geometric average initialization forces the geometric mixer to (unsurprisingly) initially behave like a geometric average of its inputs, which makes sense if one believes that the predictions of each input model are reasonable.

As an alternative to the two above initializations, one could also use small random weights, as is typically done in MLPs. However, this choice makes little practical difference and has a negative impact on reproducibility.

Learning in GLNs is straightforward in principle. As each neuron probabilistically predicts the target, the current input to any neuron is treated as a set of expert predictions and a single step of local online learning is performed using one of the no-regret methods discussed above in the section describing "logarithmic loss". For example, online gradient descent (Martin Zinkevich. Online convex programming and generalized infinitesimal gradient as¬cent. In Machine Learning, Proceedings of the Twentieth International Conference (ICML 2003), Aug. 21-24, 2003, Wash., DC, USA, pages 928-936, 2003) with $W_{ik}$ a hypercube. This allows the weight update for any neuron at layer i to be done in time complexity $O(K_{i-1})$, which permits the construction of large networks.

More precisely, let $l_t^{ij}$ ($w_{ijc}$) denote the loss of the j-th neuron in layer i. Using Eqn. (3) we have $$l_t^{ij}(w_{ijc}) = l_t(\text{GEO}_w(\bullet; p_{i-1}(z_t), x_t)) \quad (8)$$

Now, for all $i \in [1, L]$, $j \in K_i$, and for all $c = c_{ij}(z_t)$, we set $$w_{ijc}^{(t+1)} = \Pi_i(w_{ijc}^{(t)} - \eta_t \Delta l_t^{ij}(w_{ijc}^{(t)})) \quad (9)$$

where $\Pi_i$ is the projection operation onto hypercube $[-b, b]^{K_{i-1}}$:

$$\prod_i(x) = \underset{y \in [-b, b]^{K_{i-1}}}{\text{argmin}} \|y - x\|_2.$$

The projection is efficiently implemented by clipping every component of $w_{ijc}^{(t)}$ to the interval $[-b, b]$. The learning rate $\eta_t \in \mathbb{R}_+$ can depend on time.

Some computational properties of Gated Linear Networks are now discussed.

Firstly, generating a prediction requires computing the contexts from the given side information for each neuron, and then performing L matrix-vector products. Under the assumption that multiplying a m×n by n×1 pair of matrices takes O(mn) work, the total time complexity to generate a single prediction is $O(\Sigma_{i=1}^L K_i K_{i-1})$ for the matrix-vector products, which in typical cases will dominate the overall runtime. Using online gradient descent just requires updating the rows of the weight matrices using Eqn. (9); this again takes time $O(\Sigma_{i=1}^L K_i K_{i-1})$.

Secondly, when generating a prediction, parallelism can occur within a layer, similar to an MLP. The local training rule however enables all the neurons to be updated simultaneously (or more generally by a process in which multiple neurons, in the same or different levels, are updated at the same time), as they have no need to communicate information to each other. This compares favorably to back-propagation and significantly simplifies any possible distributed implementation. Furthermore, as the bulk of the computation is primarily matrix multiplication, large speedups can be obtained straightforwardly using GPUs (graphics processing units).

In the case where no online updating is desired (that is, the trained neural network is just used for prediction), prediction can be implemented efficiently depending on the exact shape of the network architecture. This can be done directly using Eqn. (7). Efficiency can be improved by solving a Matrix Chain Ordering problem to determine the optimal way to group the matrix multiplications.

Neural networks have long been known to be capable of approximating arbitrary continuous functions with almost any reasonable activation function. It can be shown that provided the contexts are chosen sufficiently richly, then GLNs also have the capacity to approximate large classes of functions. In fact, GLNs have almost arbitrary capacity. More than this, the capacity is effective in the sense that gradient descent will eventually find the approximation. In contrast, similar results for neural networks show the existence of a choice of weights for which the neural network will approximate some function, but do not show that gradient descent (or any other single algorithm) will converge to these weights. Although gated linear networks are not the only model with an effective capacity result, gated linear networks have some advantages over other architectures in the sense that they are constructed from small pieces that are well-understood in isolation and the nature of the training rule eases the analysis relative to neural networks.

While GLNs can have almost arbitrary capacity in principle, large networks are susceptible to a form of the catch-up phenomenon. That is, during the initial stages of learning, neurons in the lower layers typically have better predictive performance than neurons in the higher layers. This problem can be addressed based on switching, which is a fixed share variant tailored to the logarithmic loss. The main idea is that as each neuron predicts the target, one can construct a switching ensemble across all neurons predictions. This guarantees that the predictions made by the ensemble are not much worse than the predictions made by the best sparsely changing sequence of neurons. We now describe this process in detail.

Let $\mathcal{M} = \{\rho_{ij} : i \in [i, L], j \in [0, K_i-1]\}$ denote the model class consisting of all neurons that make up a particular GLN with L layers and $K_i$ neurons in each layer. Now for all $n \in \mathbb{N}$, for all $x_{i:n} \in \chi^n$, consider a Bayesian (non-parametric) mixture that puts a prior $w_\tau(\bullet)$ over all sequences of neurons inside the index set $\mathcal{I}_n(\mathcal{M}) = \mathcal{M}^n$, namely $$\tau(x_{1:n}) = \Sigma \upsilon_{1:n \in \mathcal{I}_n(\mathcal{M})} w_\tau(\upsilon_{1:n}) \upsilon_{1:n}(x_{1:n}) \quad (10)$$

where $\upsilon_{1:n}(x_{1:n}) = \Pi_{k=1}^n \upsilon_k(x_k | x_{<k})$. As $w_\tau(\bullet)$ is a prior, it is chosen to be non-negative and satisfy $\Sigma_{\upsilon_{1:n}} w_\tau(\upsilon_{1:n}) = 1$ for all $n \in \mathbb{N}$. From the dominance property of Bayesian mixtures it immediately follows that for any $\upsilon_{1:n}^* \in \mathcal{I}_n(\mathcal{M})$ we have $$-\log \tau(x_{1:n}) \leq -\log(w_\tau(\upsilon_{1:n}^*) \upsilon_{1:n}^*(x_{1:n})) \leq -\log(w_\tau(\upsilon_{1:n}^*)) - \log(\upsilon_{1:n}^*(x_{1:n})) \quad (11)$$

Thus the regret $$\mathcal{R}_n = -\log\left(\frac{\tau(x_{1:n})}{v_{1:n}^*(x_{1:n})}\right)$$

with respect to a sequence of models $v_{1:n}^*$ is upper bounded by $-\log(w_\tau(\upsilon_{1:n}^*))$. Putting a uniform prior over all neuron sequences would lead to a vacuous regret of $n \log (\mathcal{M})$, so it is preferably to concentrate our prior mass on a smaller set of neuron sequences which are a-priori likely to predict well.

Empirically we found that when the number of training examples is small, neurons in the lower layers usually predict better than those in higher layers, but this reverses as more data becomes available. Viewing the sequence of best-predicting neurons over time as a string, we see that a run-length encoding gives rise to a highly compressed representation with a length linear in the number of times the best-predicting neuron changes. Run-length encoding can be implemented probabilistically by using an arithmetic encoder with the following recursively defined prior:

$$w_\tau(v_{1:n}^*) = \begin{cases} 1 & \text{if } n = 0 \\ \frac{1}{|\mathcal{M}|} & \text{if } n = 1 \\ w_\tau(v_{<n}) \times \left(\frac{n-1}{n}\mathbb{1}[v_n = v_{n-1}] + \frac{1}{n(|\mathcal{M}|-1)}\mathbb{1}[v_n \neq v_{n-1}]\right) & \text{otherwise} \end{cases}$$

This assigns a high prior weight to model sequences which have short run length encodings.

When there exists a sequence of neurons with a small $s(\upsilon_{1:n}^*) \ll n$ of switches that performs well, only logarithmic regret is suffered, and one can expect the switching ensemble to predict almost as well as if we knew what the best performing sparsely changing sequence of neurons was in advance.

A direct computation of Eqn. (10) would require a very large number of additions. An equivalent numerically robust formulation is described here, which incrementally maintains a weight vector that is used to compute a convex combination of model predictions at each time step.

Let $u_{ik}^{(t)} \in (0, 1]$ denote the switching weight associated with the neuron (i, k) at time t. The weights will satisfy the invariant $\Sigma_{i=1}^{|L|}\Sigma_{k=0}^{K_i-1} u_{ik}^{(t)}=1$, for all t. At each time step t the switching mixture outputs the conditional probability $$\tau(x_t | x_{<t}) = \sum_{i=1}^{|L|} \sum_{k=0}^{K_i-1} u_{ik}^{(t)} \rho_{ik}(x_t | x_{<t})$$

with the weights defined, for all $1 \leq i \leq L$ and $0 < k < K_i$ by $u_{ik}^{(1)}=1/|\mathcal{M}|$ and $$u_{ik}^{(t+)} = \frac{1}{(t+1)(|\mathcal{M}|-1)} + \left(\frac{t|\mathcal{M}|-f-1}{(t+1)(|\mathcal{M}|-1)}\right)\frac{u_{ik}^{(t)}\rho_{ik}(x_t|x_{<t})}{\tau(x_t|x_{<t})}.$$

This weight update can be straightforwardly implemented in O($|\mathcal{M}|$) time per step. To avoid numerical issues, the weights may be enforced to sum to 1 by explicitly dividing by $\Sigma_{i=1}^{|L|}\Sigma_{k=0}^{K_i-1} u_{ik}^{(t+)}$ after each weight update.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system comprising:
   one or more computers, and
   one or more storage devices on which are stored instructions, that are operable, when executed by the one or more computers, to cause the one or more computers to perform operations for implementing one or more gated linear networks,
      wherein each gated linear network corresponds to a respective data value in an output data sample and is configured to generate a network probability output that defines a probability distribution over possible values for the respective data value,
      wherein each gated linear network comprises a plurality of layers arranged in a hierarchy of layers,
      wherein the plurality of layers comprises a plurality of gated linear layers,
      wherein each gated linear layer has one or more nodes, wherein for every node in every gated linear layer, the node is trained using a respective loss function defined for the node, and
   wherein the operations comprise, for each node in each gated linear layer that is not the first layer in the hierarchy of layers:
      receiving, as input, a respective node probability output generated by each of the one or more nodes in a layer below the gated linear layer in the hierarchy of layers, each node probability output defining a respective probability distribution over possible values of the corresponding data value associated with the gated linear network;

receiving side information for the node;

combining the respective node probability outputs generated from the one or more nodes in the layer below the gated linear layer in the hierarchy of layers according to a set of weights defined by the side information to generate an initial output;

generating, from the initial output, a node probability output that defines a probability distribution over possible values for the corresponding data value; and providing as output the node probability output for the corresponding data value.

2. The system of claim 1, wherein the node is configured to combine the respective node probability outputs generated from the one or more nodes in the layer below the gated linear layer in the hierarchy of layers according to the set of weights defined by the side information using a geometric mixture model.

3. The system of claim 1,
wherein combining the respective node probability outputs generated from the one or more nodes in the layer below the gated linear layer in the hierarchy of layers according to the set of weights comprises applying a non-linear function to each of the respective node probability outputs and combining the respective node probability outputs according to the set of weights after applying the non-linear function to determine the initial output, and
wherein generating the node probability output for the gated linear layer comprises applying an inverse of the non-linear function to the initial output to generate the node probability output.

4. The system of claim 1,
wherein each node comprises a side gate configured to apply a respective context function to the side information to determine a context value, and
wherein the node is configured to select the set of weights dependent upon the context value.

5. The system of claim 4, wherein the respective context function partitions the side information into two or more regions.

6. The system of claim 4, wherein at least two of the nodes in the gated linear network have a different respective context function.

7. The system of claim 1, wherein the respective plurality of layers comprises a first gated linear layer in the hierarchy of layers and a base layer of nodes configured to generate base probability values for input to the nodes of the first gated linear layer in the hierarchy of layers.

8. The system of claim 7, wherein the base layer of nodes are configured to receive a network input and to generate the base probability values of the corresponding data value for the network input.

9. The system of claim 1, wherein the operations further comprise:
switching weights for outputs of the nodes, comprising adjusting the weights during training to give relatively higher weights to nodes which better model a target probability density function for the corresponding data value.

10. The system of claim 1, wherein the operations further comprise:
implementing an online training procedure on a sequence of training data values in which weights of the set of weights for each of the nodes are adjusted during generation of probabilities for the sequence of training data values in response to a loss dependent upon, for each data value, (i) a probability defined by the output generated by the node and (ii) an observed value for the training data value.

11. The system of claim 10, wherein for each node the loss is defined in terms of the weights for the node and not dependent on the weights for any other nodes in the network.

12. A method performed by a neural network system implementing one or more gated linear networks,
wherein each gated linear network corresponds to a respective data value in an output data sample and is configured to generate a network probability output that defines a probability distribution over possible values for the corresponding data value,
wherein each gated linear network comprises a plurality of layers arranged in a hierarchy of layers,
wherein the plurality of layers comprises a plurality of gated linear layers,
wherein each gated linear layer has one or more nodes,
wherein for every node in every gated linear layer, the node is trained using a respective loss function defined for the node, and
wherein the method comprises, for each node in each gated linear layer that is not the first layer in the hierarchy of layers:
receiving, as input, a respective node probability output generated by each of the one or more nodes in a layer below the gated linear layer in the hierarchy of layers, each node probability output defining a respective probability distribution over possible values of the corresponding data value associated with the gated linear network;
receiving side information for the node;
combining the respective node probability outputs generated from the one or more nodes in the layer below the gated linear layer in the hierarchy of layers according to a set of weights defined by the side information to generate an initial output,
generating, from the initial output, a node probability output that defines a probability distribution over possible values for the corresponding data value; and
providing as output the node probability output for the corresponding data value.

13. The method of claim 12, wherein the node is configured to combine the respective node probability outputs generated from the one or more nodes in the layer below the gated linear layer in the hierarchy of layers according to the set of weights defined by the side information using a geometric mixture model.

14. The method of claim 12,
wherein combining the respective node probability outputs generated from the one or more nodes in the layer below the gated linear layer in the hierarchy of layers according to the set of weights comprises applying a non-linear function to each of the respective node probability outputs and combining the respective node probability outputs according to the set of weights after applying the non-linear function to determine the initial output, and
wherein generating the node probability output for the gated linear layer comprises applying an inverse of the non-linear function to the initial output to generate the node probability output.

15. The method of claim 12,
wherein each node comprises a side gate configured to apply a respective context function to the side information to determine a context value, and
wherein the node is configured to select the set of weights dependent upon the context value.

16. The method of claim 15, wherein the respective context function partitions the side information into two or more regions.

17. The method of claim 15, wherein at least two of the nodes in the gated linear network have a different respective context function.

18. The method of claim 12, wherein the respective plurality of layers comprises a first gated linear layer in the hierarchy of layers and a base layer of nodes configured to generate base probability values for input to the nodes of the first gated linear layer in the hierarchy of layers.

19. The method of claim 18, wherein the base layer of nodes are configured to receive a network input and to generate the base probability values of the corresponding data value for the network input.

20. One or more non-transitory computer-readable storage media encoded with instructions that, when executed by one or more computers, causes the one or more computers to perform operations for implementing one or more gated linear networks,
wherein each gated linear network corresponds to a respective data value in an output data sample and is configured to generate a network probability output that defines a probability distribution over possible values for the corresponding data value,
wherein each gated linear network comprises a plurality of layers arranged in a hierarchy of layers,
wherein the plurality of layers comprises a plurality of gated linear layers,
wherein each gated linear layer has one or more nodes, wherein for every node in every gated linear layer, the node is trained using a respective loss function defined for the node, and
wherein the operations comprise, for each node in each gated linear layer that is not the first layer in the hierarchy of layers:
receiving, as input, a respective node probability output generated by each of the one or more nodes in a layer below the gated linear layer in the hierarchy of layers, each node probability output defining a respective probability distribution over possible values of the corresponding data value associated with the gated linear network;
receiving side information for the node;
combining the respective node probability outputs generated from the one or more nodes in the layer below the gated linear layer in the hierarchy of layers according to a set of weights defined by the side information to generate an initial output;
generating, from the initial output, a node probability output that defines a probability distribution over possible values for the corresponding data value; and
providing as output the node probability output for the corresponding data value.

* * * * *